(12) United States Patent
Lim et al.

(10) Patent No.: US 7,551,772 B2
(45) Date of Patent: Jun. 23, 2009

(54) BLUR ESTIMATION IN A DIGITAL IMAGE

(75) Inventors: Suk Hwan Lim, San Mateo, CA (US); D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 736 days.

(21) Appl. No.: 10/999,654

(22) Filed: Nov. 30, 2004

(65) Prior Publication Data
US 2006/0115174 A1 Jun. 1, 2006

(51) Int. Cl.
*G06K 9/00* (2006.01)
(52) U.S. Cl. ..................................... 382/162
(58) Field of Classification Search ............... 382/162; 375/240.16
See application file for complete search history.

(56) References Cited

U.S. PATENT DOCUMENTS

| | | | | |
|---|---|---|---|---|
| 3,681,579 A | * | 8/1972 | Schweitzer | 708/426 |
| 5,509,086 A | * | 4/1996 | Edgar et al. | 382/167 |
| 6,166,853 A | * | 12/2000 | Sapia et al. | 359/559 |
| 6,590,679 B1 | * | 7/2003 | Edgar et al. | 358/514 |
| 6,788,825 B1 | * | 9/2004 | Fujino | 382/266 |
| 2001/0021224 A1 | * | 9/2001 | Larkin et al. | 375/240.16 |
| 2002/0071613 A1 | | 6/2002 | Ford et al. | |
| 2003/0016852 A1 | * | 1/2003 | Kaufman et al. | 382/131 |
| 2003/0095721 A1 | * | 5/2003 | Clune et al. | 382/294 |
| 2006/0093234 A1 | * | 5/2006 | Silverstein | 382/255 |

FOREIGN PATENT DOCUMENTS

EP 788070 A2 * 8/1997

OTHER PUBLICATIONS

Raymond H. Chan, et al, "Salt-and-Pepper Noise Removal by Median-type Noise Detectors and Detail-preserving Regularization" http://www.math.cuhk.edu.hk/rchan/paper/impulse.

S. Lertrattanapanich and N.K. Bose, "HR Image From Multiframes by Delaunay Triagulation: A Synopsis" ICIO IEEE 0-7803-7622-602 (2002).

Raymond H. Chan, et al, "Salt-and-Pepper Noise Removal by Median-type Noise Detectors and Detail-preserving Regularization" http://www.math.cuhk.edu.hk/rchan/paper/impulse, Jul. 30, 2004.

* cited by examiner

*Primary Examiner*—Brian P Werner
*Assistant Examiner*—Jayesh A Patel

(57) ABSTRACT

A method performed by a processing system is provided. The method comprises computing an auto-correlation of sharp channel information of a digital image, computing a cross-correlation between the sharp channel information and blurred channel information of the digital image, and estimating a blur kernel using the auto-correlation and the cross-correlation.

25 Claims, 4 Drawing Sheets

BLUR ESTIMATION IN A DIGITAL IMAGE

CROSS-REFERENCE TO RELATED APPLICATION

This application is related to U.S. patent application Ser. No. 10/982,459, filed on Nov. 4, 2004, entitled REDUCTION OF BLUR IN MULTI-CHANNEL IMAGES, and listing D. Amnon Silverstein as an inventor. The above U.S. Patent Application is assigned to the assignee of the present invention and is hereby incorporated by reference herein.

BACKGROUND

Movies, videos, and other images may be captured from one or more scenes using a video capture medium such as film or a photodetector array and a video capture device such as a camera or scanner. After processing, the video medium may be used to reproduce the images by displaying the images using a display device. The video medium may also be converted into other formats, e.g. from film into a digital format, for display or additional processing.

A video capture device often captures images with separate color channels, e.g., red, blue, and green channels. For example, a TechniColor camera captures images using a separate filmstrip for the red, green, and blue colors to generate red, green, and blue frames for each image. Similarly, a color photosensor array found in a digital camera generally includes separate pixels for capturing the red, green, and blue colors of an image.

Unfortunately, many video capture devices do not capture the separate color channels with the same image quality. One or more of the color channels in the video medium may have chromatic aberrations with respect to the one or more of the other color channels. These chromatic aberrations, such as blur, may occur as a result of the properties of either the video capture medium or the video capture device. For example, the red filmstrip in a TechniColor film may be more blurred than the blue and green filmstrips as a result of the light captured on the red filmstrip first passing through the blue filmstrip. As another example, a lens that focuses light onto a photosensor array may have different indices of refraction for different colors. Consequently, one or more of the colors in a photosensor array may be blurred with respect to one or more of the other colors because of properties of the lens.

It would be desirable to be able to reduce chromatic aberrations in a digital video.

SUMMARY

One form of the present invention provides a method performed by a processing system. The method comprises computing an auto-correlation of sharp channel information of a digital image, computing a cross-correlation between the sharp channel information and blurred channel information of the digital image, and estimating a blur kernel using the auto-correlation and the cross-correlation.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system, method, and program product for generating an enhanced digital image in a digital video is provided. The system, method, and program product contemplate calculating blur information that may be used to generate an enhanced digital image in a digital video. The blur information is calculated by computing spatial derivatives of a blurred channel and a sharp channel, computing an auto-correlation of the sharp channel, computing a cross-correlation of the sharp and blurred channels, and deriving the blur information from the auto-correlation and the cross-correlation.

Figure 1:
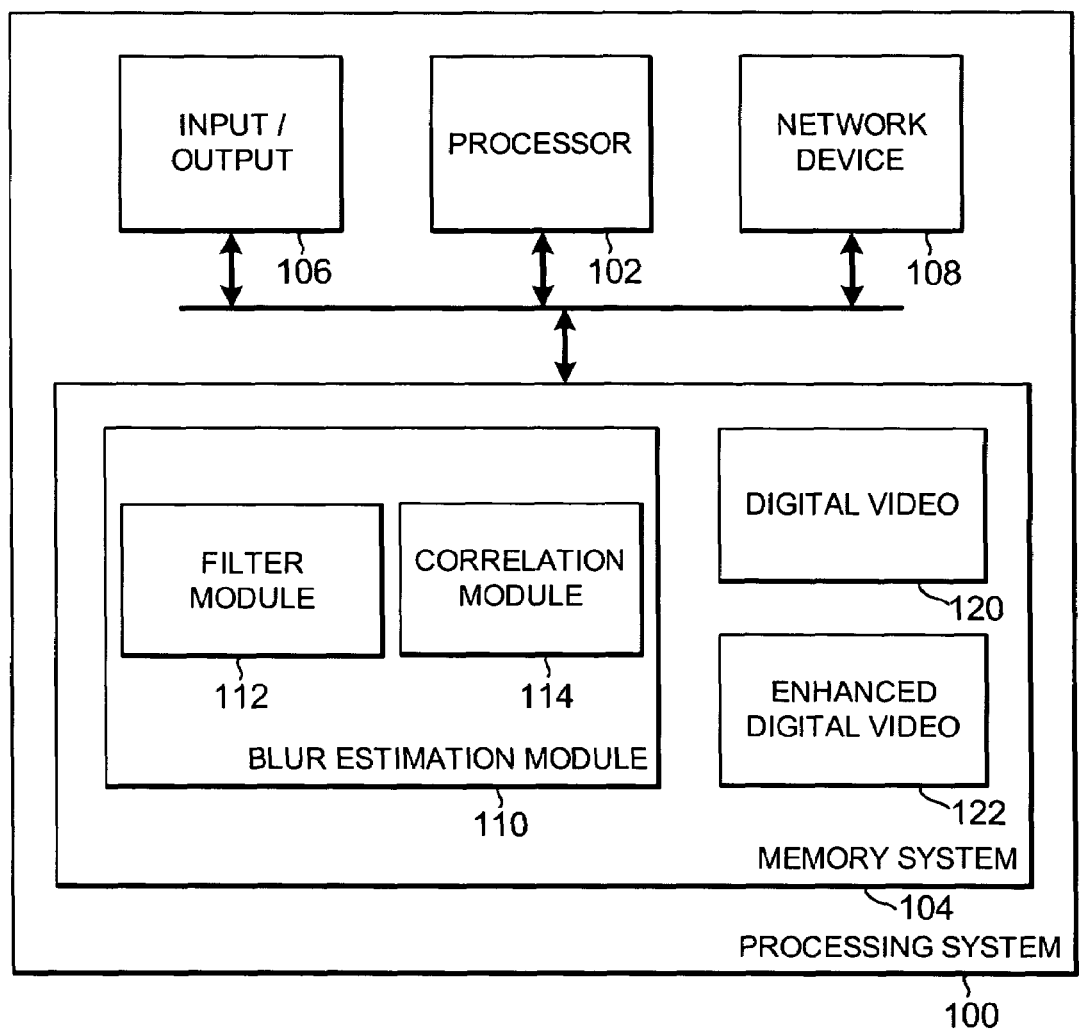
FIG. 1 is a block diagram illustrating a processing system configured to sharpen a blurred channel in a digital video according to one embodiment of the present invention.

FIG. 1 is a block diagram illustrating a processing system 100 configured to sharpen a blurred channel in a digital video 120. Processing system 100 comprises a processor 102, a memory system 104, an input/output unit 106, and a network device 108. Memory system 104 is for storing a blur estimation module 110 including a filter module 112, a correlation module 114, digital video 120, and an enhanced digital video 122.

Processing system 100 is configured to generate enhanced digital video 122 from digital video 120 using information generated by blur estimation module 110, filter module 112, and correlation module 114. The information generated by blur estimation module 110 will be referred to herein as the blur kernel. Processing system 100 comprises any type of computer system or portable or non-portable electronic device. Example computer systems include desktop, laptop, notebook, workstation, or server computer systems, and examples of electronic devices include digital cameras, digital video cameras, printers, scanners, mobile telephones, and personal digital assistants.

In one embodiment, blur estimation module 110, filter module 112, and correlation module 114 each comprise instructions stored in memory system 104 that are accessible and executable by processor 102. Memory system 104 comprises any number and types of volatile and non-volatile storage devices such as RAM, hard disk drives, CD-ROM drives, and DVD drives. In other embodiments, blur estimation module 110, filter module 112, and correlation module 114 may comprise any combination of hardware and software components configured to perform the functions described herein.

A user of processing system 100 manages and controls the operation of blur estimation module 110, filter module 112, and correlation module 114 by providing inputs and receiving outputs using input/output unit 106. Input/output unit 106 may comprise any combination of a keyboard, a mouse, a display device, or other input/output device that is coupled, directly or indirectly, to processing system 100.

Blur estimation module 110, filter module 112, correlation module 114, and digital video 120 may each be stored on a medium separate from processing system 100 (not shown) prior to being stored in processing system 100. Examples of such a medium include a hard disk drive, a compact disc (e.g., a CD-ROM, CD-R, or CD-RW), and a digital video disc (e.g., a DVD, DVD-R, or DVD-RW). Processing system 100 may access blur estimation module 110, filter module 112, correlation module 114, and digital video 120 from a remote processing or storage system (not shown) that comprises the medium using network device 108. Network device 108 may be coupled, directly or indirectly, to any type of wired or wireless local area, wide area, or global communications network.

Digital video 120 comprises a plurality of digital frames. Each frame may be displayed separately to form an image or in succession, e.g., 24 or 30 frames per second, to form a video (i.e., a set of images that may appear to be moving). Digital video 120 may comprise one or more scenes where a scene comprises a set of related frames. In one embodiment, digital video 120 comprises an RGB color space where each frame has a red frame with red pixel values, a blue frame with blue pixel values, and a green frame with green pixel values. The red, green, and blue pixel values are combined during the display of digital video 120 to reproduce the images of digital video 120. In other embodiments, each frame may comprise other sets of color frames or may combine the pixel values for each color.

Digital video 120 may be generated either from a video or other set of images from another medium, e.g., film, or from a camera or other image capture device directly. For example, a TechniColor film captured using a TechniColor camera may be converted into digital video 120 using a scanning process. In other embodiments, digital video 120 may comprise a single digital image frame or an unrelated set of image frames.

Figure 2:
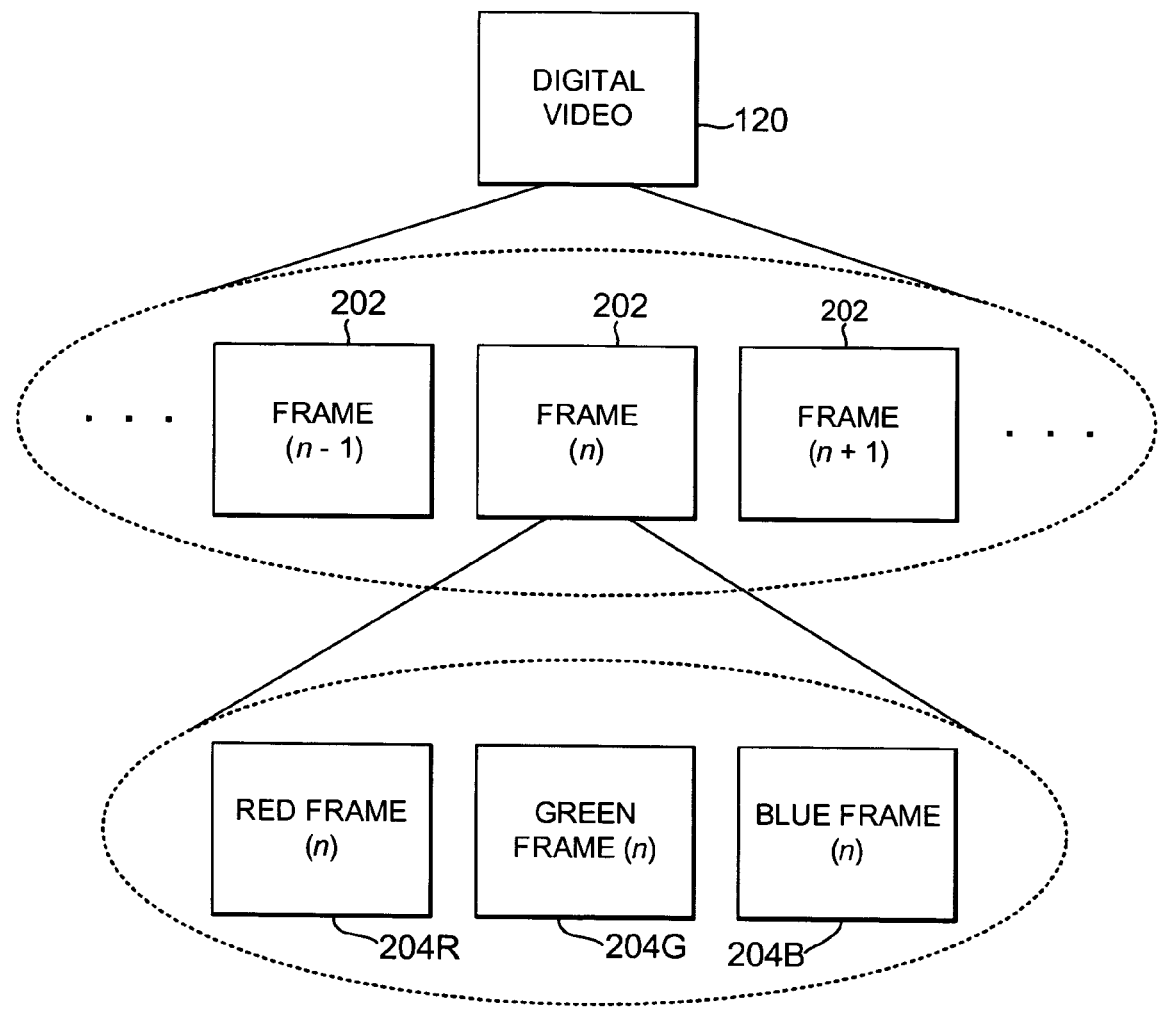
FIG. 2 is a block diagram illustrating a digital video according to one embodiment of the present invention.

FIG. 2 is a block diagram illustrating digital video 120. In the embodiment shown in FIG. 2, digital video 120 comprises a sequential series of frames 202 where each frame has a red frame 204R, a green frame 204G, and a blue frame 204B, i.e., color frames 204. In one embodiment, digital video 120 is generated from a TechniColor film or other types of film or media. In other embodiments, digital video 120 is captured directly from an image capture device such as a digital camera. The set of color frames 204 comprise red, green, and blue color channels where the red color channel comprises each of the red frames 204R in digital video 120, the green color channel comprises each of the green frames 204G in digital video 120, and the blue color channel comprises each of the blue frames 204B in digital video 120. In other embodiments, digital video 120 comprises a single image frame 202 where the frame has a red frame 204R, a green frame 204G, and a blue frame 204B.

Referring back to FIG. 1, processing system 100 executes blur estimation module 110, filter module 112, and correlation module 114 to derive the blur kernel used to generate enhanced digital video 122 from digital video 120. The blur kernel may be used to sharpen a blurred color frame 204.

Figures 3, 4:
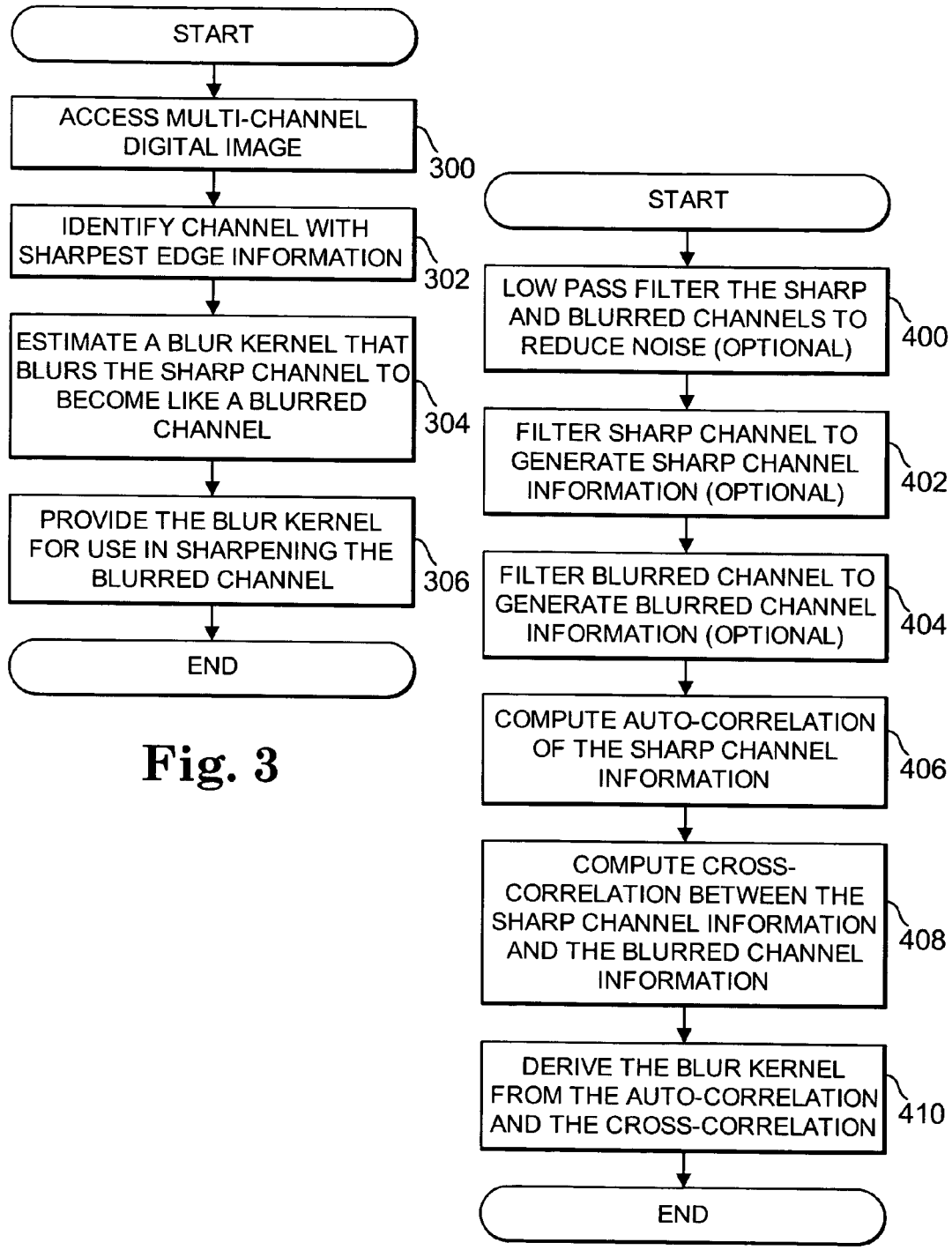
FIG. 3 is a flow chart illustrating a method for sharpening a blurred channel in a digital video according to one embodiment of the present invention.
FIG. 4 is a flow chart illustrating a method for generating a blur kernel from a digital video according to one embodiment of the present invention.

The operation of blur estimation module 110, filter module 112, and correlation module 114 will now be described with reference to FIG. 3. FIG. 3 is a flow chart illustrating a method for sharpening a blurred channel in digital video 120. The method of FIG. 3 may be performed by processing system 100 using blur estimation module 110, filter module 112, and correlation module 114 for one or more channels of digital video 120.

In FIG. 3, processing system 100 executes blur estimation module 110 to access multi-channel digital video 120 from memory system 104 as indicated in a block 300.

Processing system 100 executes blur estimation module 110 to identify a color channel in a digital image in digital video 120 with the sharpest edge information as indicated in a block 302. In one embodiment, blur estimation module 110 identifies the sharpest color channel based on the video capture medium or video capture device used to capture digital video 120. For example, if the video capture medium is a TechniColor film, blur estimation module 110 identifies either the blue channel or the green channel as the sharpest channel. Similarly, if the video capture device is a digital camera, then blur estimation module 110 identifies the sharpest channel based on known properties of the video capture device. In other embodiments, the sharpest channel can be found by computing the auto-correlations of all the channels and comparing them. The sharpest channel has the narrowest auto-correlation (i.e. high peak with low energy in the tails). In other embodiments, blur estimation module 110 applies a high pass filter or other edge detector and calculates statistics such as average gradients or other measurements of high frequency features for each channel to determine the sharpest channel. As used herein, the term high frequency feature refers to a feature that has an abrupt transition in light intensity. Examples of high frequency features include edges and texture.

Processing system 100 executes blur estimation module 110 to estimate a blur kernel that blurs the sharp channel to become like a blurred channel as indicated in a block 304. For example, if digital video 120 is generated from a TechniColor film, then blur estimation module 110 estimates a blur kernel that blurs either the blue channel or the green channel to become like the red channel. Similarly, if digital video 120 is generated from a digital camera that produces a relatively sharp red channel and a relatively blurred green channel, then blur estimation module 110 estimates a blur kernel that blurs the red channel to become like the blue channel. Additional details of estimating the blur kernel are described with reference to FIG. 4 below.

Processing system 100 executes blur estimation module 110 to provide the blur kernel for use in sharpening the blurred channel as indicated in a block 306. For example, if digital video 120 is generated from a TechniColor film, then the blur kernel is used to sharpen the red channel. Similarly, if digital video 120 is generated from a digital camera that produces a relatively sharp red channel and a relatively blurred green channel, then the blur kernel is used to sharpen the green channel.

FIG. 4 is a flow chart illustrating a method for generating a blur kernel from digital video 120 as referenced in block 304 of FIG. 3. The method of FIG. 4 may be performed by processing system 100 using blur estimation module 110, filter module 112, and correlation module 114 for one or more channels of digital video 120.

In FIG. 4, processing system 100 optionally executes filter module 112 to low pass filter the sharp and blurred channels to reduce noise as indicated in a block 400. Processing system 100 optionally executes filter module 112 to filter the sharp channel to generate sharp channel information as indicated in a block 402. Processing system 100 optionally executes filter module 112 to filter the blurred channel to generate blurred channel information as indicated in a block 404.

In one embodiment, the sharp channel information comprises the unmodified pixel values of the sharp channel, and the blurred channel information comprises the unmodified pixel values of the blurred channel. In this embodiment, the functions of blocks 400, 402, and 404 may be omitted.

In another embodiment described with reference to FIG. 5 below, the sharp channel information comprises the spatial derivative or Laplacian of the sharp channel, and the blurred channel information comprises the spatial derivative or Laplacian of the blurred channel.

Processing system 100 executes correlation module 114 to compute an auto-correlation of the sharp channel information as indicated in a block 406. Processing system 100 executes correlation module 114 to compute a cross-correlation between the sharp channel information and the blurred channel information as indicated in a block 408. Processing system 100 executes blur estimation module 110 to derive the blur kernel from the auto-correlation and the cross-correlation as indicated in a block 410.

Figure 5:
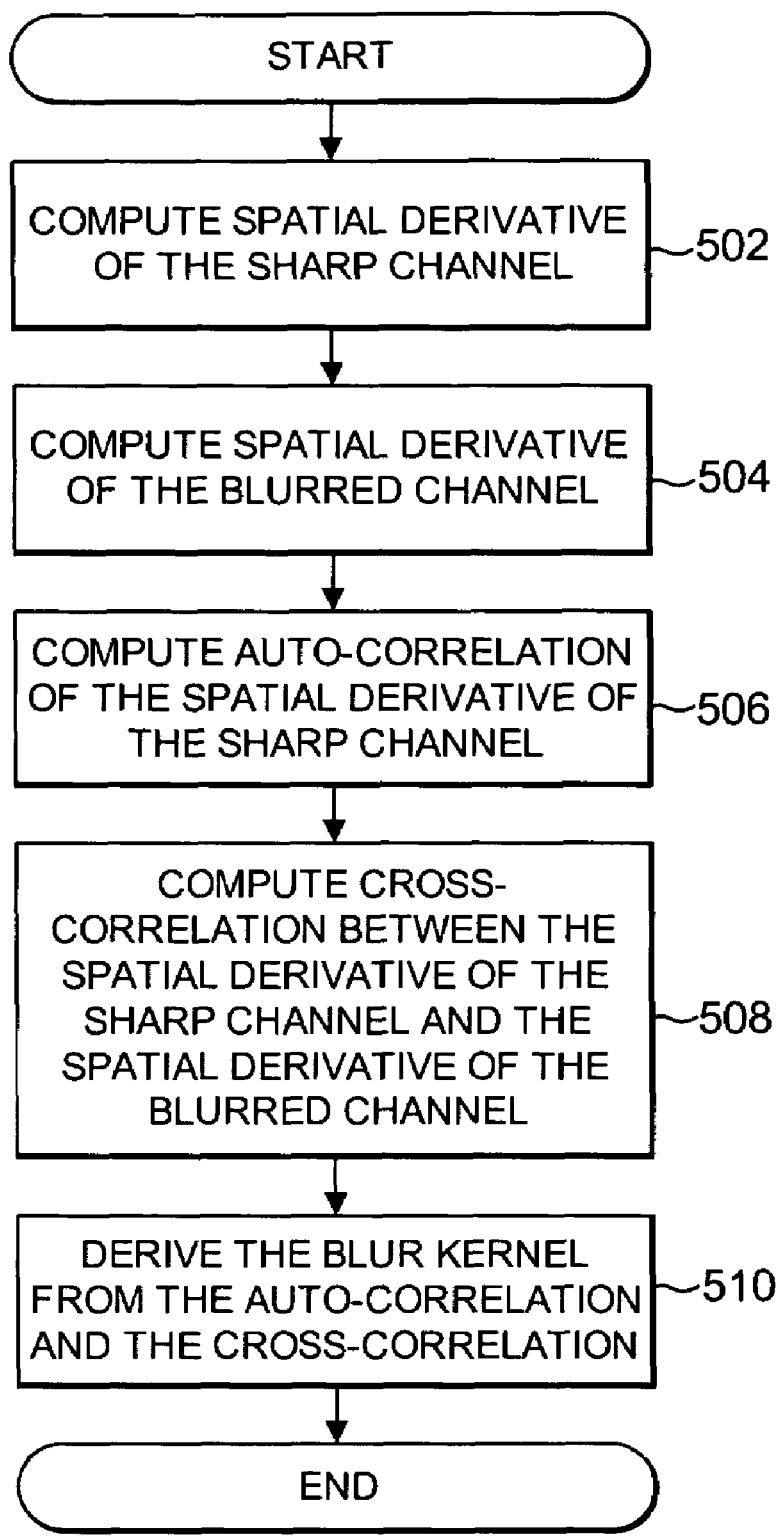
FIG. 5 is a flow chart illustrating a method for generating a blur kernel from a digital video according to one embodiment of the present invention.

FIG. 5 is a flow chart illustrating a method for generating a blur kernel from digital video 120 as referenced in block 304 of FIG. 3. The method of FIG. 5 may be performed by processing system 100 using blur estimation module 110, filter module 112, and correlation module 114 for one or more channels of digital video 120.

In FIG. 5, processing system 100 executes filter module 112 to compute the spatial derivative of the sharp channel as indicated in a block 502 and compute the spatial derivative of the blurred channel as indicated in a block 504.

In one embodiment, filter module 112 computes the Laplacian (i.e., the omni-directional spatial derivative) of the sharp and blurred channels by separately filtering the sharp and blurred channels using 2D convolution with the equation $$y(i, j) = \sum_a \sum_b l(a, b) x(i - a, j - b)$$

where $x(i,j)$ represents the input channel, $y(i,j)$ represents the spatial derivative outputs, and $l(a, b)$ represents the filter kernels used to generate the spatial derivative outputs. For a typical kernel, Laplacian, $l(a,b)$ may be defined as $l(0,0)=-1$ and $l(a,b)=\frac{1}{8}$ for ($a=1$ or $a=-1$) and ($b=1$ or $b=-1$). The equation may also be expressed in a vector form $y=Lx$ where $x(i,j)$ and $y(i,j)$ are rasterized into a vector format $x$ and $y$.

In other embodiments, the Laplacian of the sharp channel and/or blurred channel may be computed in other ways or using other filter kernels. In other embodiments, combinations of spatial derivatives may be computed rather than the Laplacian alone. The filter kernel $l_x=[0.50 \ 0 \ -0.5]$, for example, may be used for computing spatial derivatives in the x-direction, and the filter kernel $l_y=[0.50 \ 0 \ -0.5]^T$, for example, where T represents a matrix transpose, may be used for computing spatial derivatives in the y-direction.

Many blurring process occurring in typical imaging devices and films can be modeled as a 2D convolution. For example, if a sharp channel (iS) is blurred by a blur kernel (h) to yield a blurred channel (iB), the process can be modeled as iB=iS*h+N, where N is the noise and '*' is the 2D convolution operator. This model may apply locally (rather than globally) on frames and images when different color channels are used. For example, when iB is the Red channel and iS is the Green channel, the 2D convolution model described by the equation iB=iS*h+N can only be applied locally because of different chromaticities. Applying spatial derivative (or gradient) to the color channels makes the 2D convolution model of the above equation to be more accurate globally since spatial derivatives of different color channels have higher statistical dependencies than the intensities of the color channels. Spatial derivative is a linear operator and can be applied to both sides of the equation. Thus, the spatial derivatives of the sharp and blurred channels are computed such that the blur model can be better met, which may make the method more robust. The relationship between the spatial derivative of the blurred channel (dB) and the spatial derivative of the sharp channel (dS) may be represented as dB=dS*h+dN where h represents the blur kernel and dN represents spatial derivative of the random noise. Although the blur kernel may be derived using Fourier transforms and an inverse Fourier transform in the equation $$h = F^{-1}\left\{\frac{F\{dB\}}{F\{dS\}}\right\},$$

the noise term dN from the equation above distorts the calculation of the blur kernel.

The auto-correlation of the spatial derivative of the sharp channel ($C_{XX}$) and the cross-correlation between the spatial derivative of the sharp channel and the spatial derivative of the blurred channel ($C_{YX}$) share approximately the same relationship as the spatial derivative of the sharp channel and the spatial derivative of the blurred channel. In other words, $C_{YX} \approx C_{XX}*h$, where '*' is a 2D convolution. Auto and cross correlations are much less sensitive to the noise term because the correlations are global image statistics and may be estimated robustly even in the presence of high noise. This is mainly because the correlations are computed by averaging over a large image region.

Accordingly, processing system 100 executes correlation module 114 to compute an auto-correlation of the spatial derivative of the sharp channel as indicated in a block 506. Correlation module 114 computes the auto-correlation of the spatial derivative of the sharp channel using the equation $$C_{XX}(a, b) = \sum_i \sum_j x(i, j) x(i - a, i - b)$$

where $x(i, j)$ represents the spatial derivatives of the sharp channel.

Processing system 100 executes correlation module 114 to compute a cross-correlation between the spatial derivative of the sharp channel and the spatial derivative of the blurred channel as indicated in a block 508. Correlation module 114 computes the cross-correlation between the spatial derivative of the sharp channel and the spatial derivative of the blurred channel using the equation $$C_{YX}(a, b) = \sum_i \sum_j y(i, j) x(i - a, i - b)$$

where $x(i, j)$ represents the spatial derivative values of the sharp channel, and $y(i, j)$ represents the spatial derivative values of the blurred channel.

Processing system 100 executes blur estimation module 110 to derive the blur kernel from the auto-correlation and the cross-correlation as indicated in a block 510. Because the cross-correlation is blurred the same way as the blurred channel (i.e., $C_{YX} \approx C_{XX} * h$), blur estimation module 110 derives the blur kernel by solving for h using the least squares method. To do this, blur estimation module 110 rasterizes $C_{YX}$ and $C_{XX}$ into vector and matrix form as denoted as b and A, respectively. If h represents the matrix format of h (which blur estimation module 110 seeks to estimate), the equation $C_{YX} \approx C_{XX} * h$ can be re-written as b=Ah in matrix form. Thus, blur estimation module 110 derives h from b and A using a least-squares method, i.e., $h = (A^T A)^{-1} A^T b$.

Using the estimated blur kernel h, the blurred channel of a digital image in digital video 120 may be sharpened. More particularly, the low frequency components of the blurred channel are combined with the high frequency components of the sharp channel using the blur kernel h as the frequency-selective filter to determine the high and low frequency cutoff. Accordingly, the display of the digital video may be enhanced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a processing system, the method comprising:
   computing an auto-correlation of sharp channel information corresponding to a sharp channel of a digital image;
   computing a cross-correlation between the sharp channel information and blurred channel information corresponding to a blurred channel of the digital image; and
   estimating a blur kernel configured to blur the sharp channel to be like the blurred channel using the auto-correlation and the cross-correlation.

2. The method of claim 1 further comprising:
   computing a spatial derivative of the sharp channel of the digital image to generate the sharp channel information; and
   computing a spatial derivative of the blurred channel of the digital image to generate the blurred channel information.

3. The method of claim 1 wherein the sharp channel information comprises a plurality of unmodified pixel values of the sharp channel of the digital image, and wherein the blurred channel information comprises a plurality of unmodified pixel values of the blurred channel of the digital image.

4. The method of claim 1 further comprising:
   providing the blur kernel for sharpening the blurred channel of the digital image.

5. The method of claim 1 further comprising:
   identifying the sharp channel from the digital image.

6. The method of claim 1 further comprising:
   deriving the blur kernel from the auto-correlation and the cross-correlation using a least-squares method.

7. The method of claim 1 wherein the digital image is generated from a film.

8. The method of claim 6 wherein the film comprises a TechniColor film.

9. The method of claim 1 wherein the digital image is generated using a digital video capture device.

10. A system comprising:
    a processor; and
    a memory system for storing a digital image and a blur estimation module;
    wherein the processor is configured to execute the blur estimation module to:
       compute an auto-correlation of a spatial derivative of a sharp channel of a digital image;
       compute a cross-correlation between the spatial derivative of the sharp channel and a spatial derivative of a blurred channel of the digital image; and
       derive a blur kernel using the auto-correlation and the cross-correlation.

11. The system of claim 10 wherein the digital image is generated from a film.

12. The system of claim 11 wherein the film comprises a TechniColor film, wherein the sharp channel comprises a green channel, and wherein the blurred channel comprises a red channel.

13. The system of claim 10 wherein the digital image is generated using a digital video capture device.

14. The system of claim 10 wherein the processor is configured to execute the blur estimation module to:
    identify the sharp channel from the digital image.

15. The system of claim 10 wherein the processor is configured to execute the blur estimation module to:
    provide the blur kernel for sharpening the blurred channel of the digital image.

16. The system of claim 10 wherein the processor is configured to execute the blur estimation module to:
    derive the blur kernel from the auto-correlation and the cross-correlation using a least-squares method.

17. A system comprising:
    means for computing an auto-correlation of sharp channel information corresponding to a sharp channel of a digital image;
    means for computing a cross-correlation between the sharp channel information and blurred channel information corresponding to a blurred channel of the digital image; and
    means for estimating a blur kernel configured to blur the sharp channel to be like the blurred channel using the auto-correlation and the cross-correlation.

18. The system of claim 17 wherein the film comprises a TechniColor film, wherein the sharp channel comprises a green channel, and wherein the blurred channel comprises a red channel.

19. The system of claim 17 further comprising:
    means for identifying the sharp channel from the digital image.

20. The system of claim 17 wherein the blur kernel is provided for sharpening the blurred channel of the digital image.

21. The system of claim 17 further comprising:
    deriving the blur kernel from the auto-correlation and the cross-correlation using a least-squares method.

22. A computer-readable medium storing instructions readable and executable by a processing system for causing the processing system to perform a method comprising:
    computing an auto-correlation of a spatial derivative of a sharp channel of a digital image;
    computing a cross-correlation between the spatial derivative of the sharp channel and a spatial derivative of a blurred channel of the digital image; and
    estimating a blur kernel using the auto-correlation and the cross-correlation.

23. The computer-readable medium claim 22 wherein the computer-readable medium stores instructions readable and executable by the processing system for causing the processing system to perform the method comprising:

identifying the sharp channel from the digital image.

24. The computer-readable medium of claim 22 wherein the computer-readable medium stores instructions readable and executable by the processing system for causing the processing system to perform the method comprising:

providing the blur kernel for sharpening the blurred channel of the digital image.

25. The computer-readable medium of claim 22 wherein the computer-readable medium stores instructions readable and executable by the processing system for causing the processing system to perform the method comprising:

deriving the blur kernel from the auto-correlation and the cross-correlation using a least-squares method.

* * * * *

UNITED STATES PATENT AND TRADEMARK OFFICE
CERTIFICATE OF CORRECTION

| | |
|---|---|
| PATENT NO. | : 7,551,772 B2 |
| APPLICATION NO. | : 10/999654 |
| DATED | : June 23, 2009 |
| INVENTOR(S) | : Suk Hwan Lim et al. |

Page 1 of 1

It is certified that error appears in the above-identified patent and that said Letters Patent is hereby corrected as shown below:

In column 9, line 1, in Claim 23, after "medium" insert -- of --.

Signed and Sealed this

Fifth Day of January, 2010

David J. Kappos
*Director of the United States Patent and Trademark Office*